United States Patent
Griffin et al.

[11] Patent Number: 5,898,908
[45] Date of Patent: Apr. 27, 1999

[54] RF GAIN ENHANCEMENT FOR CELLULAR TELEPHONE

[75] Inventors: Lee Daniel Griffin, Raleigh; Thomas Joseph Karpus, Cary, both of N.C.

[73] Assignee: Ericsson, Inc., RTP, N.C.

[21] Appl. No.: 08/728,681

[22] Filed: Oct. 9, 1996

[51] Int. Cl.⁶ .................................................. H01Q 11/12
[52] U.S. Cl. ........................ 455/127; 455/569; 455/571; 455/575; 379/420; 343/702
[58] Field of Search ............................... 455/90, 127, 115, 455/128, 129, 95, 571, 572, 575, 345, 346, 348, 349, 350, 351, 99, 569, 121, 550, 557, 74.1, 461–462; 379/420, 426, 446, 454, 455; 330/127, 129, 279, 297, 298; 343/702

[56] References Cited

U.S. PATENT DOCUMENTS

| | | | |
|---|---|---|---|
| 4,636,741 | 1/1987 | Mitzlaff | 330/127 |
| 4,661,992 | 4/1987 | Garay et al. | 455/129 |
| 5,029,233 | 7/1991 | Metroka . | |
| 5,036,532 | 7/1991 | Metroka et al. . | |
| 5,054,115 | 10/1991 | Sawa et al. | 455/575 |
| 5,121,504 | 6/1992 | Toko | 455/349 |
| 5,212,811 | 5/1993 | Kuge et al. . | |
| 5,367,556 | 11/1994 | Marui et al. . | |
| 5,457,814 | 10/1995 | Myrskog et al. | 455/127 |
| 5,511,234 | 4/1996 | Ha | 455/127 |
| 5,555,448 | 9/1996 | Thiede et al. | 455/128 |
| 5,659,888 | 8/1997 | Kato et al. | 455/575 |

OTHER PUBLICATIONS

Patent Abstracts of Japan, vol. 015, No. 036 (E–1027), Jan. 29, 1991.

*Primary Examiner*—Doris H. To
*Attorney, Agent, or Firm*—Rhodes, Coats & Bennett, L.L.P.

[57] ABSTRACT

A portable RF telephone for use in a vehicle may be coupled to an external antenna to overcome the shielding effects of the metallic enclosure of the automobile. While coupled to the external antenna, the portable RF telephone increases the amount of power used to transmit an RF signal. Preferably, the transmit power increases to a maximum level allowed within a defined power classification. Increasing the transmit power overcomes cabling and connector losses associated with using an external antenna and further increases the effective transmitting power without exceeding power levels defined by the telephones power classification.

18 Claims, 2 Drawing Sheets

RF GAIN ENHANCEMENT FOR CELLULAR TELEPHONE

BACKGROUND OF THE INVENTION

The present invention relates generally to radio telephones and, more particularly, to enhancing the gain of a portable radio telephone during hands-free operation.

Radio frequency (RF) telephones, commonly and hereinafter referred to as cellular telephones, have come into wide use in recent years. As cellular telephone technology advanced, the cellular telephone became much smaller and more portable. Instead of mounting the cellular telephone permanently in a vehicle or within a pouch resembling a small briefcase, cellular telephones are carried on the person and easily slip into a pocket of an article of clothing or a purse. Given the enhanced portability of these cellular telephones, various types of docking adapters, commonly referred to as cradles, are available for the portable telephone to rest in for hands-free operation and storage in an automobile.

Generally, the cradles interface with the portable cellular telephones to recharge the telephone's batteries and connect to an antenna mounted on the car's exterior, among other functions. A primary concern in the present invention is providing a portable cellular telephone capable of interfacing with a cradle for hands-free operation while driving. Automobile cradles providing hands-free operation preferably include, or are associated with, an external speaker and microphone. Hands-free headsets having a microphone and speaker are also available.

Currently, portable cellular telephones are given an EIA Station Class Mark which corresponds directly to various class levels. Each class level represents the maximum amount of output power allowed when transmitting radio frequencies for a particular type of cellular telephone. For example, Class 1 telephones include car telephones having a maximum output power up to 4 watts and Class 3 telephones include hand-held portable telephones having a maximum output power up to 1.2 watts. Class 3 telephones typically operate at approximately 0.6 watts while typical Class 1 operating power is 3 watts.

When using Class 3 portable cellular telephones with currently available automotive cradles, several RF problems affect efficient communications in the up-link to the cellular base station and the down-link to the portable cellular telephone. Most notable of these problems is that the metal body and frame of the automobile acts as an RF shield, and therefore, attenuates transmission of RF signals to and from the portable cellular telephone when operated from within the vehicle. This problem is typically overcome by using an external antenna mounted on the outside of the automobile and associated with the automobile cradle through a series of RF cables and connectors. An internal RF switch which switches from the telephone's internal antenna to the external antenna associated with the cradle when the telephone is placed within the automotive cradle is included in most portable cellular telephones.

When placed in a cradle coupled to an external antenna, the portable cellular telephone is able to avoid the substantial RF losses associated with the automobile shielding. The additional cabling and connectors associated with the external antenna introduce smaller, yet significant, RF losses, thus precluding the full benefit of using an external antenna.

Prior to the present invention, cellular telephone and cradle manufacturers overcame the problems outlined above in various ways. Most portable cellular telephones use a direct connection or a reactive coupling to provide an RF interface with the external antennas. These interfaces allow for the use of external power boosters placed in series between the portable telephone's RF interface and the external antenna to increase the RF up-link transmission power from Class 3 to Class 1. The boosters increase the power up to 3 watts, which is significantly above the Class 3 maximum of 1.2 watts and well within Class 1 operating parameters. Some currently available boosters provide a low noise amplifier in the down-link receiving path to enhance receiver sensitivity and path matching. Path matching generally refers to providing substantially the same effective power for the up-link and down-link transmission paths between the telephone and a base station.

Another technique for overcoming the above mentioned problems is disclosed in the Motorola patent by Mitzlaff, U.S. Pat. No. 4,636,741. Mitzlaff discloses an approach which changes a Class 3 portable cellular telephone to a Class 1 telephone when using an automotive cradle. In particular, Mitzlaff uses a telephone with a power amplifier which operates at two different power levels. The first set of power levels is used during portable operation of the cellular telephone while apart from the cradle. The second set of higher power levels is used when the portable cellular telephone interfaces the cradle and uses an external power source having a higher voltage than the telephone's internal battery. Mitzlaff requires changing the portable cellular telephone Station Class Mark from Class 3 to Class 1 when an external power source or cradle is detected.

These solutions have significant drawbacks. Both solutions increase the Station Class Mark and add substantial expense to the telephone, cradle or both. Both external boosters and Mitzlaffs amplifier configuration amplify the transmit signal from the Class 3 rating of 0.6 watts to a Class 1 rating of 3 watts. In most situations, an increase of this magnitude is not necessary to maintain a call when traveling between cells. During normal operations, the base station will signal the cellular telephone to step up or down the telephone's transmitting power to increase or lower transmission power to an acceptable minimum level. Thus, the command from the base station nullifies the booster's or internal amplifier's additional power amplification. In most situations, adding an amount of amplification to compensate for the RF losses of the RF cable and connectors extending between the cradle and the external antenna is all that is necessary to maintain a call. Quintupling the transmitting power and changing Station Class Mark ratings is economically impractical and operational overkill.

Thus, there remains a need for a portable cellular telephone capable of interfacing with a cradle and overcoming RF losses associated with the use of an external antenna during hands-free operation without requiring specialized high-output internal power amplifier circuitry or external boosters. Furthermore, there is a need to overcome the RF losses associated with the external antenna without requiring a change in the portable cellular telephone's Station Class Mark.

SUMMARY OF THE INVENTION

The present invention provides a portable RF telephone having enhanced RF gain control when engaging an automotive cradle unit. The cradle unit is coupled to an antenna mounted on the exterior of an automobile or other vehicle or similar metallic housing. Placing the antenna outside of the automobile overcomes the shielding effects of the metallic enclosure of the automobile. While interfacing with the cradle, the portable RF telephone increases the amount of power used to transmit an RF signal through the external antenna coupled to the telephone through the cradle. Preferably, transmit power increases to a maximum level allowed within a defined power classification. Increasing the transmit power overcomes cabling and connector losses associated with using an external antenna and further increases the effective transmitting power without exceeding power levels defined by the telephone's power classification.

The telephone includes an RF transmitter adapted to provide an RF signal and amplifier circuitry having variable gain for providing variable power amplification of the RF signal to produce an output RF signal. An internal speaker and microphone provide and receive audio when the telephone is not interfacing with an external microphone and an external speaker. An internal antenna couples to the amplifier circuitry and transmits the output RF signal. Logic circuitry controls the variable gain of the amplifier circuitry and an interface couples the telephone to the external antenna. An RF receiver receives a transmitted RF signal from a remote station. A battery power supply provides power to the telephone. A cradle unit power supply supplies power to the telephone through a connector when the telephone interfaces with the cradle. When the phone is used with a hands-free kit, the logic circuitry increases the gain of the amplifier circuitry to increase the transmitting power used to transmit the RF signal. Furthermore, the telephone preferably uses the external microphone and speaker when the telephone interfaces the cradle unit.

Preferably, the telephone includes an antenna switch for switchably coupling the transmitter between the internal antenna and the interface wherein when the external antenna is coupled to the interface the transmission of the output RF signal switches from the internal antenna to the external antenna. Manual or automatic switching of the transmission path between the internal and external antennas is acceptable. The logic circuitry may determine whether the external antenna is present and switch antennas accordingly.

The logic circuitry may receive a first signal representative of the presence of an external power source through the interface from the cradle unit, a second signal representative of a request for hands-free operation of the telephone in the cradle unit and a third signal representative of the presence of a hands-free kit with or without external antenna. The logic circuitry increases the gain of the amplifier circuitry when the first, second and third signals are received from the cradle. Alternatively, the logic circuitry may receive a signal indicating the presence of an external antenna through the interface from the cradle unit and increase the gain of the amplifier circuitry when the signal is received from the cradle. Preferably, the logic circuitry communicates via the interface with the logic circuitry of the cradle unit, wherein the cradle unit and telephone communicate information relating to operations of the telephone and cradle unit. In existing cellular telephone applications, the logic circuitry or controller and software is configured to increase RF transmission power within a selected range and transmit through the external antenna when the cellular telephone is operated within the automobile with the external antenna.

The present invention provides a method of enhancing RF gain for portable RF telephones comprising the steps of determining if an external antenna is coupled to the portable telephone, switching a path of transmission for an output RF signal from an internal antenna of the portable telephone to the external antenna coupled to the portable telephone, and increasing the transmitting power level for the output RF signal within a predefined power range. The level of power amplification preferably increases to a maximum power level within the predefined range when transmitting with the external antenna. When operating at higher power levels, the method may include monitoring the temperature of select components of the telephone and controlling the level of power amplification to control the temperature of the telephone to avoid overheating the telephone or any components associated therewith.

These and other aspects of the present invention will become apparent to those skilled in the art after a reading of the following description of the preferred embodiments when considered with the drawings.

DESCRIPTION OF THE PREFERRED EMBODIMENTS

Figure 1:
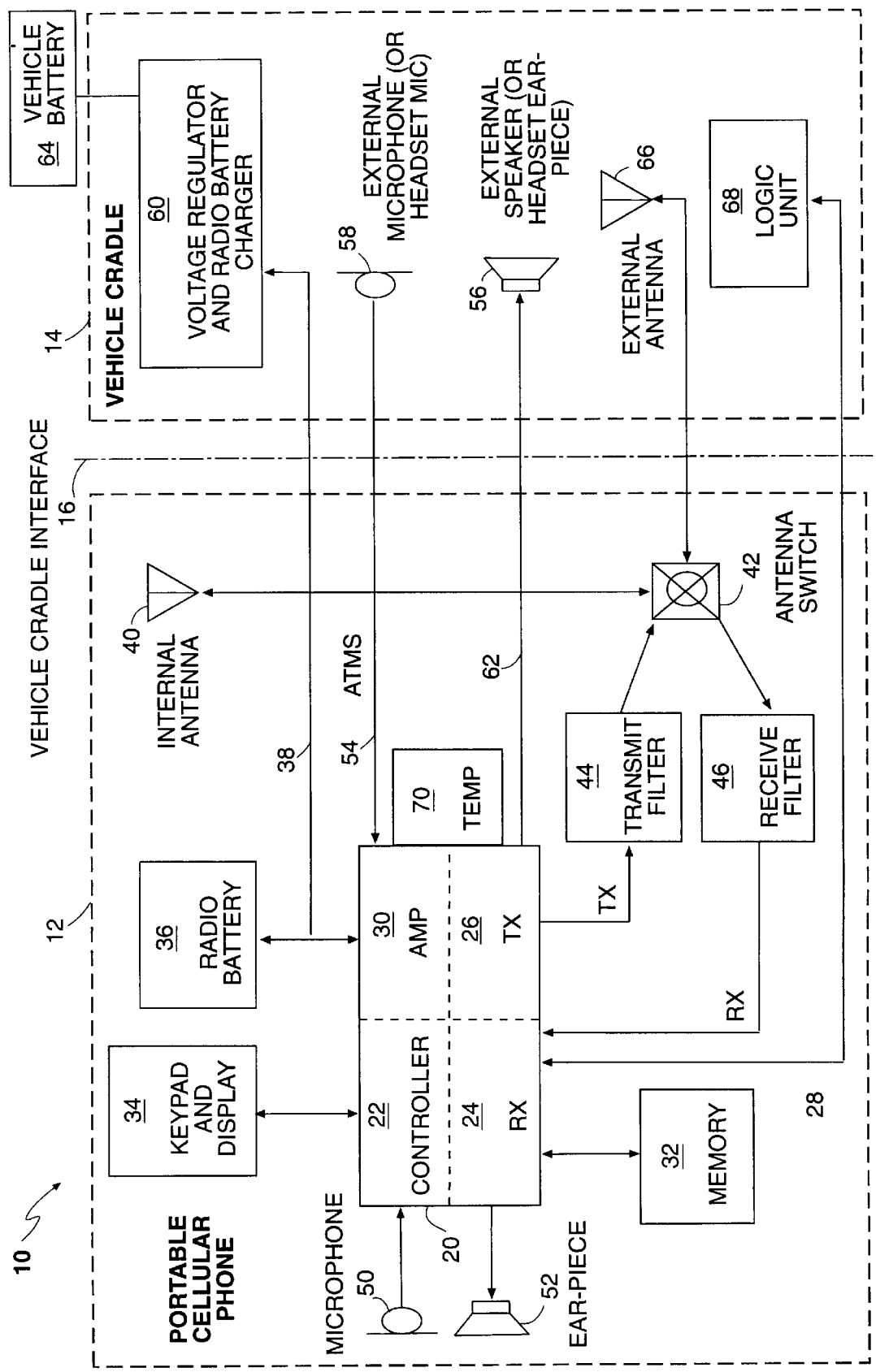
FIG. 1 is a schematic of an embodiment of a portable cellular telephone, a vehicle cradle and an interface constructed according to the present invention for providing RF gain enhancement for portable cellular telephones.

In the following description, like reference characters designate like or corresponding parts throughout the several views. It will be understood that the illustrations are for the purpose of describing a preferred embodiment of the invention and are not intended to limit the invention thereto.

As best seen in FIG. 1, an RF gain enhancement system for a portable RF telephone, generally designated 10, is shown constructed according to the present invention. The gain enhancement system 10 includes two major components: a portable cellular telephone 12 and a vehicle cradle 14. The vehicle cradle 14 typically is physically configured to receive and securely engage the portable cellular telephone 12 for both storage and use while in an automobile or other vehicle or similar metallic housing. While engaging the vehicle cradle 14, the portable cellular telephone 12 interfaces with the vehicle cradle 14 at a telephone/cradle interface 16. Preferably, the cellular telephone 12 and the vehicle cradle 14 interface with one another when the cellular telephone 12 is placed in the vehicle cradle 14 without requiring additional connections.

The invention may be implemented in currently available cellular telephone and cradle configurations or incorporated into new designs. Many existing cellular telephone configurations will require only a software reconfiguration. The embodiment of FIG. 1 shows the basic configuration of a currently available portable cellular telephone 12. The telephone 12 includes a radio and logic unit 20 having a controller 22, a receiver 24, a transmitter 26 and a power amplifier 30. The controller 22 controls the basic operation of the telephone 12 according to various data and programs stored in a memory 32 in conjunction with numerous inputs from a variety of sources.

The receiver 24 receives signals transmitted to the telephone 12 from a remote base station transmitter (not shown). The signals received from the base station typically include both audio and data information. The transmitter 26 transmits audio and control signals from the portable cellular telephone 12. The power amplifier 30 amplifies the signal transmitted from the transmitter 26 according to a desired gain controlled by controller 22. Control bus 28, which extends between the radio and controller unit 20 and the vehicle cradle 14, facilitates bi-directional control and data communication between telephone 12 and cradle 14. The data communication can come from several sources including but not limited to the cradle itself and/or an external data source such as a modem (not shown).

The Station Class Mark defined by the Federal Communications Commission determines a maximum allowable transmitting power to be provided by the amplifier 30. Many hand-held cellular telephones receive a Class 3 rating, limiting the maximum transmission power to 1.2 watts compared to 4 watts for telephones having a Class 1 rating. Although the maximum power output for a Class 3 telephone is 1.2 watts, the telephone operates at substantially lower power levels, typically around 0.6 watts, or less, during normal operation. During cellular communication, the base station communicates with the portable cellular telephone (mobile station) and instructs the telephone to lower the transmitting power to a sufficient yet acceptable level. As more power is needed, such as when the distance between the base and mobile station is extended, the base station requests the mobile station to increase the transmit power to a higher level. Thus, in normal cellular operations, the controller 22 controls the amount of transmit power, as dictated by the mobile station, by controlling the gain of the power amplifier 30 within the range of the designated Station Class Mark given the respective portable cellular telephone 12.

Additionally, the portable cellular telephone 12 includes an internal microphone 50 and ear-piece 52; a keypad and display 34; a rechargeable battery 36; an internal antenna 40; an antenna switch 42; a transmit filter 44 and a receive filter 46. In normal portable (non-hands-free) operation, the cellular telephone 12 uses the internal microphone 50 and ear-piece 52 to receive and provide audio from and to the user, respectively. Additionally, the antenna switch 42 directs transmitted audio signals to the internal antenna 40. The transmit filter 44 provides output filtering prior to transmission.

The rechargeable battery 36 powers the portable cellular telephone 12 during portable operation. Alternatively, the radio and controller unit 20 receives power from the vehicle cradle 14 when the cellular telephone 12 is attached thereto. The power bus 38 provides DC power and ground from the cradle 14 and may or may not provide a charge control signal from the radio and logic unit 20 to a battery charger 60 associated with the cradle 14. The charge control signal controls the battery charger 60 as necessary to recharge the battery 36.

The vehicle cradle 14 generally includes an external microphone 58, an external speaker 56, a voltage regulator and battery charger 60, an external antenna 66 and a logic unit 68. A vehicle battery 64 powers the voltage regulator and battery charger 60. The regulator and battery charger 60 interface with the power bus 38 of the telephone 12 to power the telephone and recharge the portable telephone's battery 36.

The external microphone 58 and the external speaker 56 couple with the radio and logic unit 20 through the telephone/cradle interface 16 via line 54 and line 62, respectively. Optionally, a hands-free headset having a microphone and ear-piece is used instead of the external microphone 58 and speaker 56. Lines 54 and 62 may include some form of signal conditioning electronics such as filters or amplifiers if necessary.

The external antenna 66 interfaces with the antenna switch 42 of the telephone 12. When the external antenna 66 is present, the antenna switch 42 directs transmitted and received signals through cradle 14 and onto the external antenna 66 through a system of cables and connectors connecting the external antenna 66 and cradle 14.

In operation, the controller 22 determines when the telephone 12 is properly inserted in the cradle 14. Preferably, the control bus 28 carries information or signals indicative of proper engagement of the telephone 12 within the cradle 14. Typically, the mere presence of signals on the control bus 28 indicate the presence of a cradle. The logic unit 68 of the cradle 14 sends data or provides signals indicating the presence of the external antenna 66, an external headset or external microphone 58 and speaker 56. The logic unit 68 and the cradle 14 may optionally provide data or signals requesting the controller 22 of the cellular telephone 12 to operate in an external hands-free mode in which the external antenna 66 associated with the cradle 14 is used. Those of ordinary skill in the art should have no difficulty in configuring the cellular telephone 12 and the vehicle cradle 14 to recognize the engagement therebetween or the presence of an external antenna.

Figure 2:
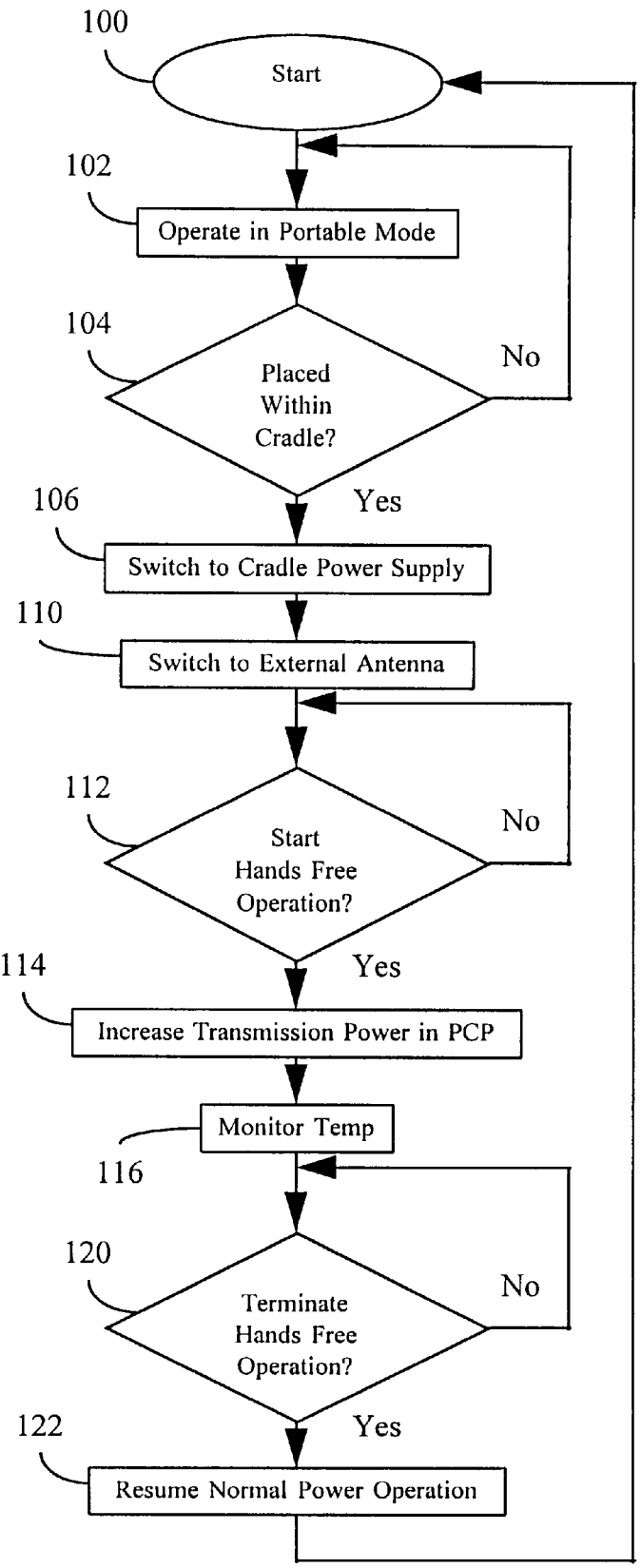
FIG. 2 is a flowchart outlining the basic operation of the embodiment of FIG. 1.

Turning now to FIG. 2, the basic operation of the preferred embodiment of the present invention is described. When the telephone 12 is initially activated for portable operation, the controller 22 will initiate operation in a portable mode (Block 102). In portable operation mode, the controller 22 controls the gain of the power amplifier 30 to provide transmitting power within the Class 3 rating range of 0 to 1.2 watts. The level of power used within the class rating depends upon the transmitted signal level received at the base station. The signal strength received at the base station is indicative of the amount of power required at the telephone 12. Thus, the telephone 12 adjusts the amount of amplification provided by the power amplifier 30 according to signals received from the base station. The base station typically signals the telephone 12 to transmit at the lowest acceptable power level providing a clear communications link. For example, the base station has the telephone step up the transmitting power as the distance or interference between the base station and the telephone increases and visa-versa.

The telephone 12 continues to operate in a portable mode until it is placed within the cradle 14 (decision Block 104). Once the telephone 12 securely engages and interfaces the cradle 14, the telephone 12 uses power supplied from the cradle 14 through the voltage regulator and battery charger 60 (Block 106). Additionally, the telephone 12 switches from using the internal antenna 40 to the external antenna 66 and associated cabling via the antenna switch 42. Preferably, the antenna switch 42 automatically switches to the external antenna 66 once the telephone 12 validly interfaces the cradle 14 (Block 110).

Switching from the internal antenna 40 to the external antenna 66 is critical since the performance of the internal antenna 40 is substantially limited when used within an automobile. As noted, the metallic enclosure of the automobile acts as a radio frequency shield. This RF shielding greatly attenuates the effective performance of the internal antenna 40 in receiving and transmitting signals during operation.

When the telephone operates in a hands-free mode using the external antenna 66 (Block 112), the controller 22 increases the transmitting power of the power amplifier 30 (Block 114). Increasing the transmitting power overcomes any losses associated with the antenna cabling and connectors and improves signal reception. In a typical cradle and external antenna kit, the external antenna 66 provides a 3 dB gain and the external antenna cabling and connectors cause a 1 dB loss. Thus, there is approximately a 2 dB gain from normal portable performance outside of the vehicle. A Class 3 portable telephone typically provides 0.6 watts (27 dBm) during portable operation and an effective output power of 0.8 watts (29 dBm) is the maximum output power when the typical portable telephone is used in is a cradle 14 with an external antenna 58. As noted, the EIA standard allows Class 3 telephone output power to reach 1.2 watts (30.8 dBm) without having to change power classes.

The present invention increases the amount of transmitting power supplied by the power amplifier 30 when an external antenna 66 is available for transmission. Preferably, the controller 22 increases the typical output power from 0.6 watts up to a maximum of 1.2 watts. At maximum power, the amount of power provided by the telephone 12 and cradle 14 is doubled (plus 3 dB). Doubling the effective output power substantially improves signal reception and communication distance while remaining in Class 3 operation. Furthermore, increasing the transmit power when used with a cradle and external antenna improves the Class 3 RF path match since base stations provide constant power for down-link regardless of whether Class 1 or Class 3 cellular telephones are used. The down-link receiver sensitivity of the telephone 12 remains unchanged throughout this process since Class 3 and Class 1 receivers have the same receiver specifications (−116 dBm).

One of the primary reasons portable cellular telephones do not operate at maximum power is the importance of conserving energy. Most portable telephones reduce power consumption as much as possible during operation to extend battery life. Normally, the telephone receives signals from the base station indicative of the strength of the telephone signal being received at the base station. The signal received by the telephone from the base station determines the minimum acceptable amount of transmitting power required for maintaining the communication link while maintaining a desired amount of audio clarity during portable operation.

Power conservation is not a substantial concern when the telephone 12 is placed in the cradle 14 since the substantial power reserve of the vehicle battery is available. At this time, the telephone 12 overrides normal operations and operates at higher power levels to overcome cabling losses and further improve path matching and audio quality. When operating in conjunction with the external antenna 66, the telephone preferably ignores or reduces the amount of decrease in transmitting power requested by the base station.

For optimum cellular communication performance, the telephone's transmit power increases to a maximum level within the designated class rating. Operating the telephone 12 in an enhanced power mode with an external antenna substantially increases audio performance and the amount of distance and interference over which a communication link may be maintained.

When operating the telephone 12 and particularly the power amplifier 30 at higher or maximum power levels, the telephone 12 must handle the increase in heat generated due to the increase in current flow through the amplifier circuitry. Preferably, the controller 22 monitors the temperature of various components such as the telephone case and power amplifier temperatures (Block 116). Any type of integrated or separate temperature sensor 70 is acceptable to provide temperature information. According to this information, the controller 22 manages power usage of transmit levels as necessary to keep the temperature resulting from heat generated from the power amplifier within acceptable levels.

Fortunately, the increase in current used to provide the additional transmit power levels allows the telephone's power amplifier 30 to operate more efficiently, thus, requiring less than expected input power to achieve elevated power levels while operating. When hands-free operation is discontinued (Block 120), the telephone 12 resumes operating at the reduced power levels.

The power output from a portable cellular telephone is effectively raised by configuring the telephone controller 22 to operate the power amplifiers 30 at higher levels. The power output from the telephone is increased by 2 or 3 dBm without exceeding maximum power levels for a particular Station Class Mark. The increase in power output compensates for the antenna cable and connector losses of approximately 1 dBm and provides an additional 1 or 2 dBm gain. Thus, the present invention provides more equally matched up-link and down-link paths, improves audio quality and increases the distance over which a communication link may be maintained.

The portable cellular telephone is preferably placed in enhanced power mode by the presence of both the following conditions: the telephone 12 properly interfaces with the cradle 14, which preferably has an external antenna 66, and hands-free operation is requested. The telephone 12 may go into an enhanced power mode upon request, but preferably activates enhanced power automatically when the above conditions are satisfied.

Currently, a portable cellular telephone may determine whether the above conditions are satisfied by detecting three signals: PWRSRC (external power source present), HOOK (hands-free request/audio path control) and DTMS (data to mobile station). The PWRSRC signal indicates that an external power source is available to allow the power amplifiers to operate at elevated power levels. The HOOK signal indicates that a hands-free request is made and the DTMS signal indicates that an external microphone and speaker or headset is present to provide hands-free operation. The control bus 28 preferably carries the PWRSRC, HOOK and DTMS signals.

Control bus 28 generally includes a DFMS signal (data from mobile station). Newer is "smart" vehicle cradle kits may communicate data relating to the type of accessories associated with the cradle via the DTMS and DFMS signals without monitoring for the presence of signals merely indicative of the presence of the various accessories.

The enhanced power mode is preferably terminated by the occurrence of any of the following conditions: the telephone is turned off, one of the signals indicating valid external hands-free operation (PWRSRC, HOOK or DTMS) is removed, or the user requests that the enhanced power mode be turned off.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A portable radio telephone with enhanced gain control comprising:

a) an RF transmitter adapted to provide an RF signal;
   b) internal amplifier circuitry having variable gain for providing variable power amplification of the RF signal to produce an output RF signal;
   c) an internal antenna coupled to said internal amplifier circuitry and adapted to transmit the output RF signal;

d) an interface adapted to couple said telephone to an external antenna to transmit the output RF signal from the external antenna when said interface is coupled to said external antenna;

e) means for generating a first signal representative of the presence of an external power source, a second signal representative of a request for hands-free operation of said telephone, and a third signal representative of the presence of an external microphone and speaker; and f) logic circuitry coupled to said internal amplifier circuitry for controlling the variable gain of said internal amplifier circuitry, said logic circuit being operative to increase the gain of said internal amplifier circuitry from a first gain level to a second gain level within the same power class rating only when said first, second and third signals are simultaneously present.

2. The portable radio telephone of claim 1 wherein the select power class rating corresponds to a Station Class Mark.

3. The apparatus of claim 2 wherein the Station Class Mark is class 3.

4. The portable radio telephone of claim 1 further comprising an antenna switch for selectively coupling said transmitter to said internal antenna and said interface, wherein when the external antenna is coupled to said interface the transmission of the output RF signal is switched from said internal antenna to the external antenna.

5. The portable radio telephone of claim 4 wherein said antenna switch automatically directs the output RF signal from said internal antenna to the external antenna when the external antenna is coupled to said interface.

6. The portable radio telephone of claim 4 wherein said logic circuitry is adapted to direct the output RF signal from said internal antenna to the external antenna in response to a signal indicating that the external antenna is present.

7. The portable radio telephone of claim 1 wherein said interface is adapted to couple to an external cradle unit, the external antenna is coupled to the cradle unit, and said interface of said telephone couples to the antenna via the cradle unit.

8. The portable radio telephone of claim 1 wherein said portable telephone is adapted to receive power from an external power supply.

9. The portable radio telephone of claim 8 wherein said interface is adapted to couple to an external cradle unit having the external power supply, said telephone adapted to use power from the external supply when said telephone interfaces with the cradle unit.

10. The portable radio telephone of claim 1 wherein said portable telephone is adapted to receive audio from an external microphone and provide audio to an external speaker through said interface.

11. The portable radio telephone of claim 10 wherein said interface comprises an external cradle coupled to the external microphone and speaker, said telephone adapted to use the microphone and speaker when said telephone interfaces with the cradle unit.

12. The portable radio telephone of claim 10 wherein said portable telephone further comprises an internal speaker and microphone to provide and receive audio when said telephone is not interfacing with an external microphone and an external speaker through said interface to provide and receive the audio.

13. The portable radio telephone of claim 12 wherein said interface comprises an external cradle coupled to the external microphone and speaker, said telephone adapted to use the external microphone and speaker when said telephone interfaces with the cradle unit.

14. The portable radio telephone of claim 1 wherein said portable telephone further comprises an RF receiver adapted to receive a transmitted RF signal from a remote station, said telephone adapted to receive the transmitted RF signal through the external antenna when said telephone is coupled to said interface of said telephone.

15. The portable radio telephone of claim 1 wherein said logic circuitry is adapted to receive through said interface a signal indicating the presence of an external antenna, said logic circuitry increasing the gain of said amplifier circuitry when the signal is received from the cradle.

16. A portable radio communications device with enhanced gain control, comprising:

a) a hand-held unit including an RF transmitter for providing an RF signal, an internal amplifier circuit having a variable gain for providing variable power amplification of the RF signal to produce an output RF signal, an antenna coupled to said internal amplifier circuit for transmitting said output RF signal, and a receiver coupled to said antenna for receiving a transmitted RF signal from a remote station;

b) a cradle unit coupled to an external power source for engaging and holding said hand-held unit, said cradle unit including an interface for a hands-free kit including a microphone and speaker;

c) means for generating a first signal representative of the presence of an external power source, a second signal representative of a request for hands-free operation of said telephone, and a third signal representative of the presence of an external microphone and speaker; and d) a logic circuit coupled to said internal amplifier circuit in said hand-held unit for controlling the gain of said internal amplifier circuit, said logic circuit being operative to increase the gain of said internal amplifier circuit to increase the power level of the output RF signal from a first level to a second level within the same power class rating, only when said first, second and third signals are simultaneously present.

17. The portable radio communications device of claim 16 further including an external antenna coupled to said cradle for transmitting said output RF signal when said hand-held unit is interfaced with said cradle unit.

18. The apparatus of claim 16 wherein said logic circuitry is adapted to receive through said interface from the cradle unit a signal indicating the presence of an external antenna, said logic circuitry increasing the gain of said amplifier circuitry when the signal is received from the cradle.

* * * * *